United States Patent [19]

Miyashita et al.

[11] Patent Number: 4,473,786

[45] Date of Patent: Sep. 25, 1984

[54] METHOD FOR CONTROLLING ANGULAR POSITION AND APPARATUS THEREFOR

[75] Inventors: Kunio Miyashita; Tadashi Takahashi, both of Hitachi; Hiroshi Hayashida, Mito; Shigeki Morinaga; Kosho Ishizaki, both of Hitachi, all of Japan

[73] Assignee: Hitachi, Ltd., Tokyo, Japan

[21] Appl. No.: 354,282

[22] Filed: Mar. 3, 1982

[30] Foreign Application Priority Data

| Mar. 4, 1981 | [JP] | Japan | 56-29939 |
| Mar. 27, 1981 | [JP] | Japan | 56-43956 |
| May 6, 1981 | [JP] | Japan | 56-66865 |
| Aug. 28, 1981 | [JP] | Japan | 56-134129 |

[51] Int. Cl.³ .............................................. G05B 13/00
[52] U.S. Cl. ..................................... 318/561; 318/618; 318/617; 318/602
[58] Field of Search ............... 318/561, 616, 617, 618, 318/602

[56] References Cited

U.S. PATENT DOCUMENTS

| 3,241,015 | 3/1966 | Allen | 318/617 X |
| 3,729,668 | 4/1973 | Brette | 318/617 X |
| 4,031,443 | 6/1977 | Droux et al. | 318/617 X |
| 4,099,112 | 7/1978 | Klinger | 318/561 |
| 4,166,970 | 9/1979 | Cardot et al. | 318/561 |
| 4,215,903 | 7/1980 | Pollard et al. | 318/617 X |

Primary Examiner—B. Dobeck
Attorney, Agent, or Firm—Antonelli, Terry & Wands

[57] ABSTRACT

A method and apparatus for controlling the angular position of a motor by controlling the revolution of the motor in response to a given positioning command value commanding a predetermined angular position of the motor shaft so as to stop the motor shaft at the predetermined angular position, wherein the acceleration of the motor being accelerated in the initial acceleration stage of the motor position control operation is calculated, and on the basis of the calculated acceleration and a commanded maximum velocity, the remainder angular distance between the deceleration starting angular position and the desired angular position of the motor and the deceleration command value in the deceleration stage are calculated so as to control the deceleration of the motor on the basis of the calculated values.

11 Claims, 27 Drawing Figures

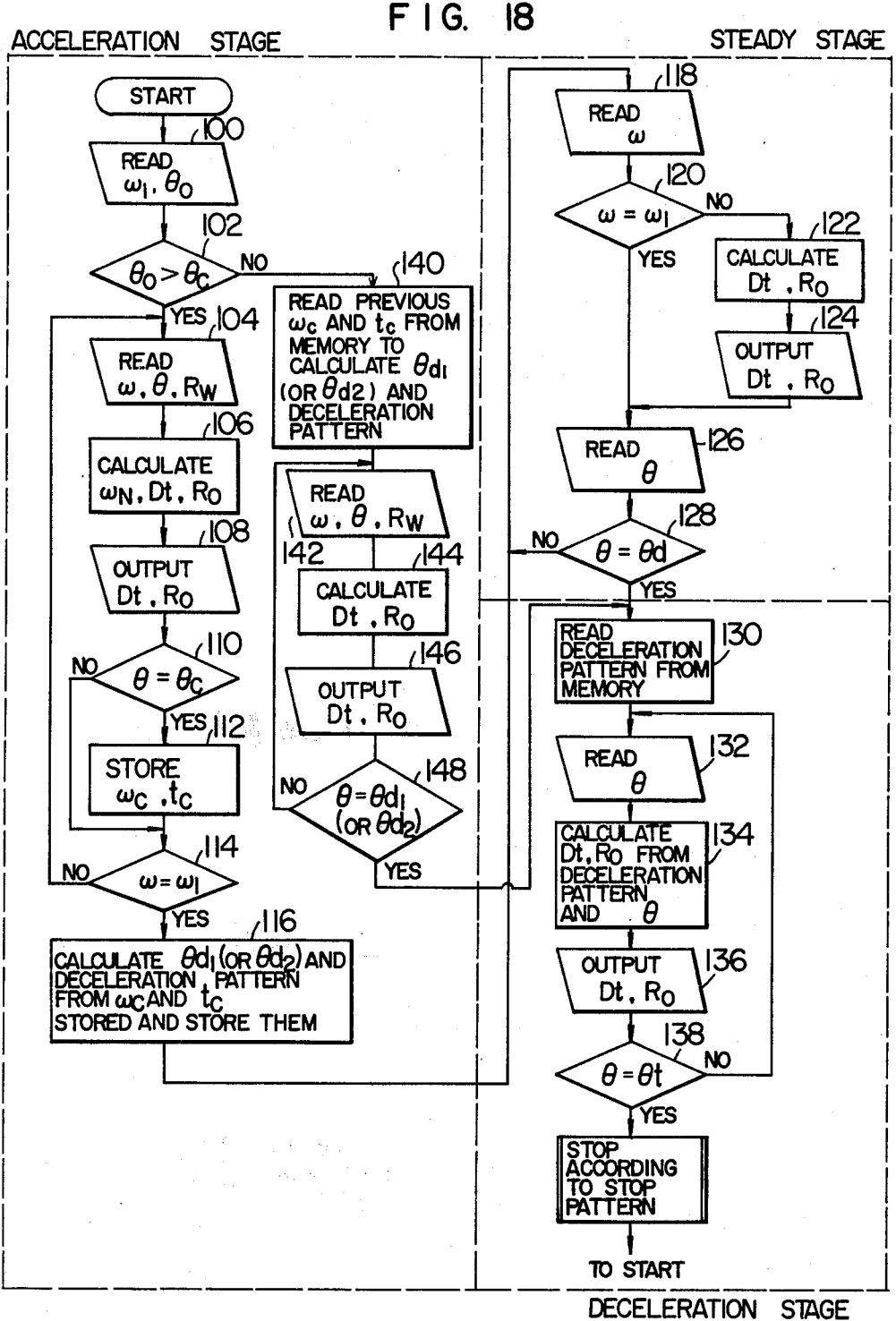

METHOD FOR CONTROLLING ANGULAR POSITION AND APPARATUS THEREFOR

This invention relates to a method and apparatus for controlling the angular position (referred to hereinafter merely as a position) of a motor. More particularly, this invention relates to a motor position control method and apparatus in which a control circuit is provided so that a motor equipped on its operating shaft with an encoder for measuring or encoding the position of the operating shaft of the motor can be driven at a predetermined revolution velocity, thereby ensuring forward or backward revolution or displacement of a load through a given angle in a stepping mode.

A stepping motor or a motor equipped with a clutch (a clutch motor) is known as an apparatus which can drive a load stepwise through a given angle.

Although the stepping motor has the merit that it can make desired stepping feed of a load under open loop control, it has the demerit that its overall volume increases inevitably when a large torque is required or when a high-speed response is required.

On the other hand, the clutch motor is commonly incorporated in a machine such as an industrial sewing machine and is featured by a good high-speed response. In the industrial sewing machine, it is important for the motor to feed a load stepwise through a given angle within a shortest possible time, and researches and studies have been made to meet the above requirement. However, the clutch motor has still such shortcomings that the clutch tends to be subject to wear relatively rapidly and large noise is generated during on-off of the clutch.

In an effort to obviate the defects pointed out above, a method has been proposed in which a DC motor equipped on its operating shaft with an encoder for detecting the revolution angle of the shaft is employed to improve the high-speed response and useful service life of the motor. Such a method is disclosed in, for example, Barna Szabados et al, "A Time-Optimal Digital Position Controller Using a Permanent-Magnet DC Servomotor", IEEE Transactions on Industrial Electronics and Control Instrumentation, Vol. IECI-19, No. 3, August 1972.

In the disclosed method, the motor is controlled to be capable of angular positioning (referred to hereinafter merely as positioning) by the function of a control circuit including a switching circuit making switching operation in response to the output signal of the encoder to apply a variable voltage across the motor to cause forward or backward revolution of the motor.

Information handling apparatus occupy now a greater proportion of the load of such a motor, and the motor shaft encounters a variety of moments of inertia or load torques.

It has therefore been a prior art practice to directly couple the motor to its control circuit and to suitably adjust the gain or like factor of the control loop, so that the motor under positioning operation can be stopped as smooth as possible with minimized hunting.

Since, in such an arrangement, a variation in the power supply voltage energizing the motor is equivalent to a variation in the gain of the control loop, it has heretofore been required to re-adjust the gain of the control loop whenever such a voltage variation is detected, or to additionally provide a circuit which detects the level of the power supply voltage for the purpose of automatic adjustment of the gain of the control loop.

It is a primary object of the present invention to obviate all of the prior art problems pointed out above and to provide a motor position control method capable of attaining the desired positioning control with minimized hunting regardless of a variation of the inertia of the load or a variation of the current supplied to the motor during the process of positioning control and to provide also a motor position control apparatus which can be directly used for the practice of the control method.

In accordance with one aspect of the present invention, there is provided a method for controlling the angular position of a motor equipped on its rotary shaft with an encoder for encoding the angular position of the motor under rotation so that the angular position of the motor can be controlled in response to a given positioning command value, wherein the method comprises the steps of reading a commanded maximum velocity; detecting the acceleration of the motor being accelerated in the initial acceleration stage of the motor position control operation; calculating the motor deceleration-start remainder angular distance and the velocity command value for decelerating the motor in the deceleration stage on the basis of the commanded maximum velocity and the detected acceleration; and decelerating the motor on the basis of the calculated motor deceleration-start remainder angular distance and the calculated deceleration velocity command value to stop the motor at the angular position commanded by the given positioning command value.

In accordance with another aspect of the present invention, there is provided a method for controlling the angular position of a motor equipped on its rotary shaft with an encoder for encoding the angular position of the motor under rotation so that the angular position of the motor can be controlled in response to a given positioning command value, wherein the method comprises the steps of comparing the given positioning command value with a predetermined reference value; detecting the acceleration of the motor being accelerated in the initial acceleration stage of the motor position control operation when the result of comparison in the first step proves that the given positioning command value is not smaller than the predetermined reference value, and calculating the motor deceleration-start remainder angular distance and the velocity command value for decelerating the motor in the deceleration stage on the basis of the detected acceleration and an externally commanded maximum velocity, thereby generating signals indicative of the calculated motor deceleration-start remainder angular distance and the calculated deceleration velocity command value; generating signals indicative of a pregiven motor deceleration-start remainder angular distance and a pregiven deceleration velocity command value or generating signals indicative of the motor deceleration-start remainder angular distance and the deceleration velocity command value used in the previous motor control operation, when the result of comparison in the first step proves that the given positioning command value is smaller than the predetermined reference value; and decelerating the motor on the basis of the motor deceleration-start remainder angular distance and the deceleration velocity command value provided by the signals to stop the motor at the angular position commanded by the given positioning command value.

In accordance with still another aspect of the present invention, there is provided a method for controlling the angular position of a motor equipped on its rotary shaft with an encoder for encoding the angular position of the motor under rotation so that the angular position of the motor can be controlled in response to a given positioning command value, wherein the method comprises the steps of reading a commanded maximum velocity; detecting the acceleration of the motor being accelerated in the initial acceleration stage of the motor position control operation; calculating the motor deceleration-start remainder angular distance on the basis of commanded maximum velocity and detected acceleration, selecting a most suitable deceleration pattern from among a plurality of previously stored deceleration patterns, and calculating the deceleration velocity command value for executing the control according to the selected deceleration pattern; and decelerating the motor on the basis of the calculated motor deceleration-start remainder angular distance and the calculated deceleration velocity command value to stop the motor at the angular position commanded by the given positioning command value.

In accordance with yet another aspect of the present invention, there is provided an apparatus for controlling the angular position of a rotary shaft of a motor, comprising an encoder supported on said rotary shaft and for encoding the angular position of the rotary shaft, and a control circuit for applying a positive or negative variable voltage across said motor in response to a given positioning command value, wherein the control circuit comprises means for applying the given positioning command value; means for detecting the revolution velocity and angular position of the rotary shaft on the basis of the output of the encoder; signal processing means for calculating the acceleration of the motor in the initial acceleration stage of the motor position control operation, the motor deceleration-start remainder angular distance and the velocity command value for decelerating the motor in the deceleration stage on the basis of the applied given positioning command value, the detected velocity and the detected angular position; and means for driving the motor by applying the positive or negative variable voltage across the motor on the basis of the results of calculation.

In accordance with another aspect of the present invention, there is provided an apparatus for controlling the angular position of a rotary shaft of a motor, comprising an encoder supported on said rotary shaft and for encoding the angular position of the rotary shaft, and a control circuit for applying a positive or negative variable voltage across the motor in response to a given positioning command value, wherein the control circuit comprises means for applying the given positioning command value; means for detecting the revolution velocity and angular position of the rotary shaft on the basis of the output of the encoder; means for applying a maximum velocity command value; signal processing means for processing signals indicative of the applied given positioning command value, the applied maximum velocity command value, the detected velocity and the detected angular position and generating the results of signal processing; and mens for driving the motor by applying the positive or negative variable voltage across the motor on the basis of the results of signal processing by the signal processing means, the signal processing means calculating the acceleration of the motor being accelerated in the initial acceleration stage of the motor position control operation on the basis of the signals indicative of the velocity and angular position of the rotary shaft when the result of comparison between the given positioning command value and a predetermined reference value proves that the former is not smaller than the latter, and calculating the motor deceleration-start remainder angular distance and the deceleration velocity command value on the basis of the calculated acceleration and the given maximum velocity for generating them as the results of signal processing.

The above and other objects, features and advantages of the present invention will become more apparent from the following detailed description of preferred embodiments thereof taken in conjunction with the accompanyin drawings, wherein:

FIGS. 18 to 20 are flow charts illustrating various forms of the motor position control method according to the invention.

Figure 1:
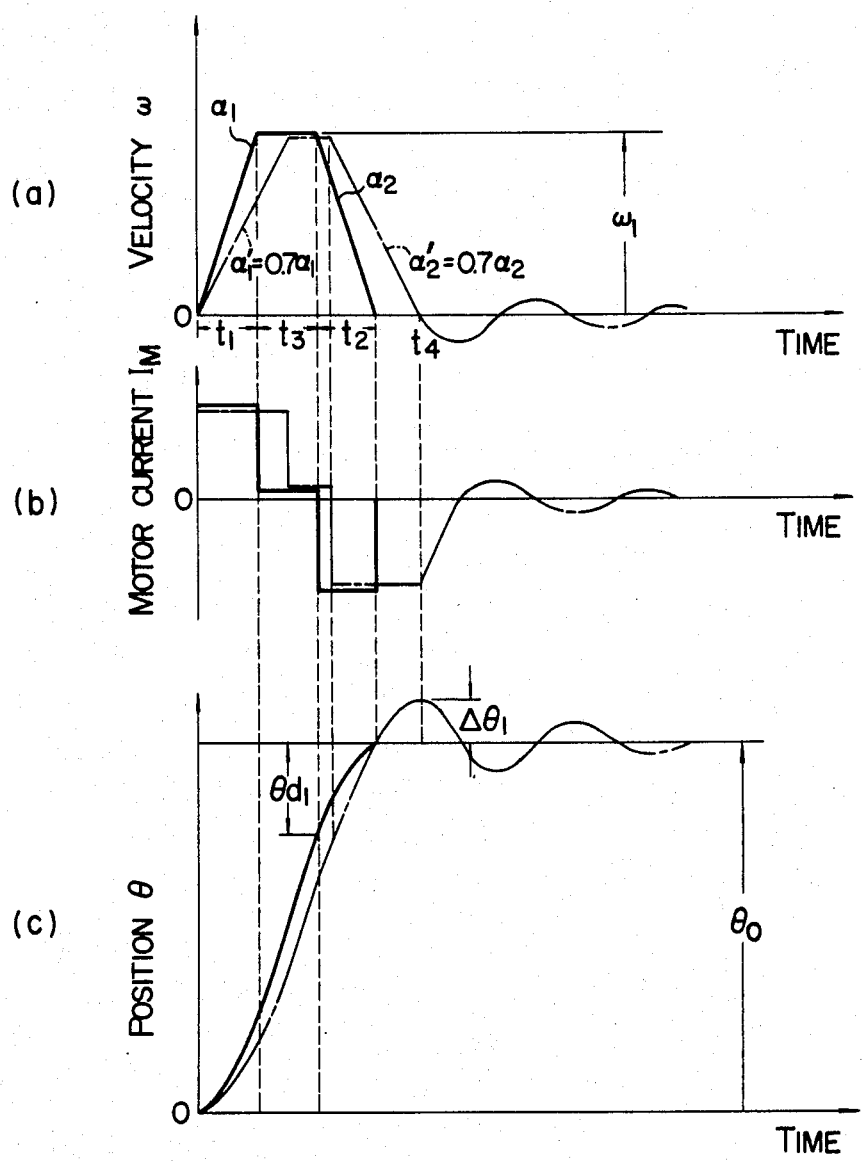
FIG. 1 is a diagram illustrating especially the mode of deceleration during motor position control.

For a better understanding of the present invention, the basic technical idea and principal features of the present invention will now be explained before describing preferred embodiments of the present invention in detail.

First of all, various factors will be considered which have a concern with the positioning control of a motor having an encoder mounted on its operating shaft.

(1) Positioning command value $\theta_o$ (rad)

This command value $\theta_o$ represents the angular distance over which the operating shaft of the motor is to be rotated in the forward or backward direction from its starting position until it is stopped at the desired position.

In the case of the clutch motor incorporated in, for example, an industrial sewing machine, this command value $\theta_o$ exceeds scarcely the angle corresponding to one revolution of the operating shaft of the motor. However, in the case of a motor incorporated in, for example, a printer used with a data processor, it is not seldom that the positioning command value $\theta_o$ exceeds 1,800 in terms of the degree unit, that is, the angle corresponding to more than several revolutions of the motor shaft.

(2) The number of pulses P per revolution of the encoder directly coupled to the motor shaft The larger the number of pulses P, the higher is the resolution of the feed angle which can be selected during the positioning control (the number of selectable feeds).

When the positioning command value $\theta_o$ (rad) is expressed in terms of the number of pulses P, that value $\theta_{op}$ (pulses) is as follows:

$$\theta_{op} = \frac{P}{2\pi} \cdot \theta_o \text{ (pulses)} \quad (1)$$

(3) Motor torque $T_M$ (Kg-m)

This represents the torque produced by the motor and is expressed as follows:

$$T_M = K_t I_M \quad (2)$$

where $K_t$ is the torque constant (Kg-m/A) of the motor, and $I_M$ is the motor current (A).

This torque constant $K_t$ is peculiar to each individual motor and is given by the following equation (3):

$$K_t = K_1 \cdot N_1 \cdot \phi \quad (3)$$

where $K_1$ is a constant, $N_1$ is the number of turns of the winding of the motor, and $\phi$ is the magnetic flux (wb) in the motor.

Small-sized motors rated at less than several hundred watts are most frequently employed in information handling apparatus, and a permanent magnet motor is the most typical one of them. The permanent magnet of such a motor produces the magnetic flux $\phi$ above described, and the value of the magnetic flux $\phi$ produced by the permanent magnet is variable depending on the temperature. The temperature coefficient is $-0.2\%/°C$. in the case of a ferrite magnet. This means that a 20% variation occurs in the magnetic flux when, for example, the temperature is raised up to 80° C. from $-20°$ C.

The motor current $I_M$ is given by the following equation (4):

$$I_M = \frac{E - E_o}{R} \text{ (A)} \quad (4)$$

where E is the voltage (V) applied across the motor. This motor voltage E is obtained by chopping the power supply voltage $E_{dc}$(V) by a control circuit including a plurality of switching elements, for example, a thyristor chopper circuit providing the duty factor $D_t$ and is given by the following equation (5):

$$E = D_t E_{dc}(V) \quad (5)$$

$E_o$ in the equation (4) represents the voltage (V) induced in the motor and is given by the following equation (6):

$$E_o = K_2 \cdot \omega \cdot N_1 \cdot \phi \quad (6)$$

where $K_2$ is a constant, $\omega$ is the angular velocity (rad/sec) of the motor under rotation, and $N_1$ and $\phi$ are the number of turns of the winding of the motor and the magnetic flux in the motor respectively, as described already.

In the equation (4), $R(\Omega)$ represents the sum of the resistance $R_a(\Omega)$ of the armature of the motor and the resistance $R_x(\Omega)$ of the wiring extending from the control circuit to the motor. The armature resistance $R_a$ of the motor is variable depending on the operating temperature of the motor.

(4) Moment of inertia J (Kg-m·sec²) of motor shaft

The moment of inertia J is given by the following equation (7):

$$J = J_M + J_L \quad (7)$$

where $J_M$ is the moment of inertia of the motor, and $J_L$ is the moment of inertia of a load coupled to the motor shaft when converted into that of the motor shaft.

(5) Load torque $T_L$ (Kg-m)

The difference between this load torque $T_L$ and the motor torque $T_M$ given by the equation (2) provides the acceleration torque $T_1$ available for accelerating the motor shaft. Thus, the acceleration torque $T_1$ is given by the following equation (8):

$$T_1 = T_M - T_L \quad (8)$$

On the other hand, the deceleration torque $T_2$ available for the deceleration of the motor shaft is given by the following equation (9) since the direction of the load torque $T_L$ is the same as that of the starting torque:

$$T_2 = T_M + T_L \quad (9)$$

(6) Allowable maximum velocity $\omega_{1-1}$ (rad/sec)

The velocity $\omega$ of the motor under rotation attains its maximum value $\omega_m$ when the voltage E applied across the motor has its maximum value $E_m$. However, depending on the character of a load such as a printer in an information handling apparatus to which the motor is coupled, the motor is not allowed to rotate at its maximum velocity $\omega_m$ and is allowed, in most cases, to rotate at an allowable maximum operating velocity $\omega_{1-1}$ ($\omega_{1-1} < \omega_m$).

This allowable maximum velocity $\omega_{1-1}$ is selected to be a value which fully satisfies the operation of the apparatus and sufficiently ensures the reliability and durability of the apparatus. Thus, the allowable maximum velocity $\omega_{1-1}$ of the motor is determined to meet the mechanism and operation of the apparatus. Therefore, the allowable maximum velocity $\omega_{1-1}$ of the motor is not always the same and is dependent upon the mechanism of the specific apparatus in which the motor is installed.

(7) Acceleration $\alpha_1$ and deceleration $\alpha_2$ (rad/sec$^2$)

The acceleration $\alpha_1$ and deceleration $\alpha_2$ of the motor are given by the following equations (10) and (11) respectively:

$$\alpha_1 = \frac{T_M - T_L}{J_M + J_L} = \frac{T_1}{J} \quad (10)$$

$$\alpha_2 = \frac{T_M + T_L}{J_M + J_L} = \frac{T_2}{J} \quad (11)$$

For the optimized positioning control of the motor, how to control the velocity of the motor for rotating the motor shaft to the desired position will then be considered.

The instantaneous position $\theta$ (rad) of the motor shaft, that is, the angular distance (referred to hereinafter merely as a distance) over which the motor shaft has rotated from its starting position, is given as a function of the velocity $\omega$ (rad/sec) of the motor as follows:

$$\theta = \int_0^t \omega dt \quad (12)$$

It can be seen that the position $\theta$ is calculated by integrating the velocity $\omega$ with time.

The motor operates in a manner as will be described now in response to the positioning command $\theta_o$ indicative of the desired position to which the motor shaft is to be rotated. The motor is initially accelerated from the velocity $\omega=0$ in the standstill state to the commanded maximum velocity $\omega_1$ (rad/sec) ($\omega_1 < \omega_{1-1}$), and is steadily rotated at this commanded maximum velocity $\omega_1$ for a certain length of time. Judgement is then made as to whether or not the remainder distance $\theta_\alpha$ (rad) from the present position to the desired position (referred to hereinafter merely as a remainder distance) is close to the value at which deceleration is to be started, and, when the result of judgement proves that the remainder distance $\theta_d$ (rad) is close to the deceleration starting value, the motor is decelerated from the commanded maximum velocity $\omega_1$.

FIG. 1 illustrates how the motor is accelerated and then decelerated. FIG. 1 shows in (a) the time-related change of the motor velocity $\omega$, in (b) the time-related change of the motor current $I_M$ and in (c) the time-related movement of the motor position $\theta$.

The solid curves in (a), (b) and (c) of FIG. 1 represent the velocity, current and position when the motor and its control circuit are sufficiently adjusted to meet the mechanism of the specific apparatus, and it will be seen that the motor operates and stops smoothly without hunting. On the other hand, the one-dot chain curves indicate that, due to application of the motor to another apparatus or due to a different level of the control voltage in the control circuit, the same motor and same control circuit are not ineffective resulting in appearance of hunting.

At first, the motor operation represented by the solid curves will be explained.

In FIG. 1(a), $t_1$, $t_2$ and $t_3$ represent the length of time required for accelerating the motor from the initial velocity $\omega=0$ to the commanded maximum velocity $\omega_1$, the length of time required for decelerating the motor from the commanded maximum velocity $\omega_1$ to the velocity $\omega=0$, and the length of time during which the motor is rotated steadily at the commanded maximum velocity $\omega_1$, respectively.

In FIG. 1(b), the motor current $I_M$ has the same value during the stages of acceleration and deceleration, but its direction in the deceleration stage is opposite to that in the acceleration stage. It will be seen that the value of the motor current $I_M$ in the steady operation stage rotating at the commanded maximum velocity $\omega_1$ is very small compared with those in the acceleration and deceleration stages.

FIG. 1(c) illustrates that, until the position $\theta$ attains the value commanded by the positioning command $\theta_o$, the position $\theta$ moves in a parabolic mode in the acceleration stage, in a linear mode in the steady operation stage, and in an exponential mode in the deceleration stage.

The value of the remainder distance $\theta_d$ over which the motor shaft is to be rotated to reach the desired position $\theta_o$ is $\theta_{d1}$ at the time at which the motor starts to be decelerated. When the velocity $\omega$ is reduced to zero, the remainder distance $\theta_\alpha$ is approximately zero to attain the relation $\theta = \theta_o$, so that the motor can be smoothly stopped.

In contrast, in the case of the motor operation represented by the one-dot chain curves, both of the acceleration and the deceleration are lower by 30% than those in the case represented by the solid curves. This means, for example, that, due to the incorporation of the motor in a different apparatus or due to the supply of power supply voltage of different level to the control circuit, the values of the acceleration $\alpha_1$ and deceleration $\alpha_2$ calculated according to the equations (10) and (11) respectively decrease by 30% compared with the aforementioned values. Thus, the acceleration $\alpha_1'$ and deceleration $\alpha_2'$ in such a case are given by $\alpha_1' = 0.7 \alpha_1$ and $\alpha_2' = 0.7 \alpha_2$.

In the case of the motor operation represented by the one-dot chain curves, therefore, the length of time $t_1$ required for acceleration is longer by 30% than that represented by the solid curve. The motor is similarly steadily rotated at the commanded maximum velocity $\omega_1$ after attainment of that velocity level, and the stage of deceleration starts as soon as the remainder distance $\theta_d$ attains the value $\theta_{d1}$ at which the deceleration is to be started. At time $t_4$ at which the velocity $\omega$ is finally decreased to zero, the position $\theta$ exceeds the positioning command value $\theta_o$ by $\Delta\theta_1$. This is attributable to the fact that the length of time of deceleration increases by 30% compared with that represented by the solid curve because of the 30% decrease in the deceleration, and, consequently, the distance to be moved by the motor in the stage of deceleration becomes longer than the remainder distance $\theta_{d1}$ indicative of the value at which deceleration is to be started.

The direction of revolution of the motor is reversed at time $t_4$ so as to reduce the excess $\Delta\theta_1$ to zero. In this manner, the motor is finally stopped, while hunting a plurality of times, by the combination of the damping action of the control system and the function of a stop control routine.

It will be understood from the above description that the present invention is based upon finding of the fact that there is a fixed relationship between the acceleration in the acceleration stage and the deceleration in the deceleration stage. The present invention is featured by measuring the acceleration in the acceleration stage and, on the basis of the measured acceleration, calculating the remainder distance $\theta_{d1}$ indicative of the value at which the motor starts to be decelerated (referred to hereinafter merely as a deceleration-start remainder distance). The above feature of the present invention will now be described in further detail.

From the aforementioned equations (10) and (11), the relation between the deceleration $\alpha_2$ and the acceleration $\alpha_1$ can be expressed as follows:

$$\alpha_2 = \frac{T_M + T_L}{T_M - T_L} \cdot \alpha_1 \quad (13)$$

Therefore, the deceleration-start remainder distance $\theta_{d1}$ can be determined as follows:

$$\theta_{d1} = \frac{1}{2} \cdot \omega_1 \cdot \omega_1 \cdot \frac{1}{\alpha_2} \quad (14)$$

$$= \frac{1}{2} \cdot \omega_1^2 \cdot \frac{T_M - T_L}{T_M + T_L} \cdot \frac{1}{\alpha_1}$$

$$= \frac{1}{2} \cdot K_{ad} \cdot \omega_1^2 \cdot \frac{1}{\alpha_1}$$

where $K_{ad}$ is $(T_M - T_L)/(T_M + T_L)$ which is a constant.

In the value of the acceleration $\alpha_1$ measured in the method and apparatus according to the present invention, consideration is taken with respect to the effects of the motor current $I_M$, magnetic flux $\phi$, power supply voltage $E_{dc}$, duty factor $D_t$, motor armature resistance $R_a$, wiring resistance $R_x$, moment of inertia $J_M$ of the motor and moment of inertia $J_L$ of the load. Therefore, the value of the deceleration $\alpha_2$ required for decelerating the stepping motor feeding stepwise the load through a given angle can be accurately calculated for each stepping feed. Further, due to the fact that the deceleration-start remainder distance $\theta_{d1}$ is calculated for each stepping feed of the load, the motor can be smoothly stopped without hunting at the end of its stepping feed in a manner as shown by the solid curve in FIG. 1(c).

Figure 2:
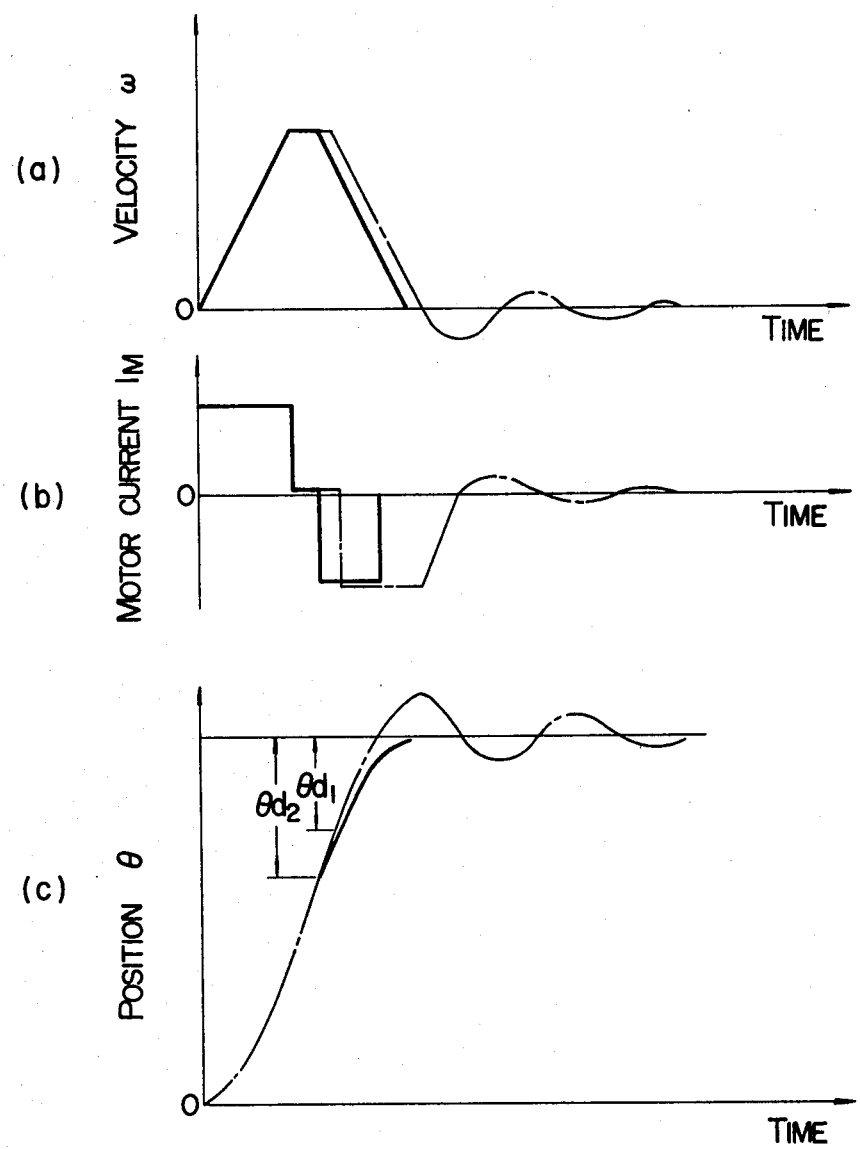
FIG. 2 is a diagram illustrating an improved mode of deceleration in the case of the position control indicated by the one-dot chain lines in FIG. 1.

The one-dot chain curves shown in FIG. 1 are thus improved as shown by the solid curves in FIG. 2. For simplicity of explanation, it is assumed that the load torque $T_L$ is negligibly small compared with the motor torque $T_M$ developed during acceleration and deceleration. That is, it is assumed that $K_{ad} \approx 1$. As a matter of fact, $T_L$ is less than several percent of $T_M$ in various fields of application to information handling apparatus. Under the above condition in which $K_{ad}$ is regarded to be $K_{ad} \approx 1$, the deceleration $\alpha'_2$ and the deceleration-start remainder distance $\theta_{d2}$ can be calculated according to the following equations:

$$\alpha'_2 = \alpha'_1 \quad (15)$$

$$\theta_{d2} = \frac{1}{2} \cdot \omega_1^2 \cdot \frac{1}{\alpha'_1} \quad (16)$$

From the equation (16), $\theta_{d2}$ is expressed as $$\theta_{d2} = \frac{1}{2} \cdot \omega_1^2 \cdot \frac{1}{0.7\alpha_1}$$

$$= 1.5\theta_{d1}$$

It will be understood therefore that $\theta_{d2}$ is 1.5 times as large as $\theta_{d1}$.

Herein, the value of the motor current $I_M$ in the deceleration stage is assumed to be the same as that in the acceleration stage. Considering the fact that the motor is commonly accelerated and decelerated within a shortest possible time, the value of the motor current $I_M$ can be regarded to be the same as that limited by the current capacity of the control circuit.

The method of measuring the acceleration is classified into the method of measuring the rate of velocity change per unit time and the method of detecting the length of time required for the velocity to make a unit change.

Figure 3:
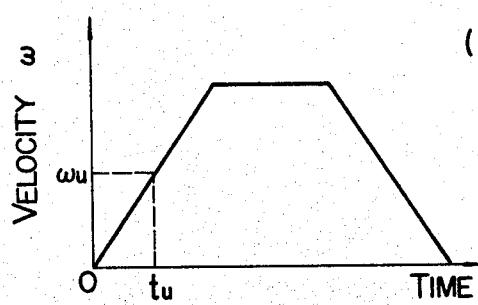
FIG. 3 is a graph illustrating the manner of calculating the acceleration by measuring the rate of change of velocity per unit time.

FIG. 3 illustrates the former method. In FIG. 3, the velocity $\omega_u$ at time $t=t_u$ at which a unit length of time has elapsed from the starting time $t=0$ ($\omega=0$), is measured, and, on the basis of the measured velocity $\omega_u$, the acceleration $\alpha_1$ is calculated according to the following equation (17):

$$\alpha_1 = \omega_u / t_u \quad (17)$$

However, the acceleration $\alpha_1$ need not necessarily be measured from the starting time $t=0$ ($\omega=0$) in the manner shown in FIG. 3. The acceleration $\alpha_1$ may be calculated by measuring the velocity $\omega=\omega_b$ at time $t=t_b$ at which a unit length of time $t_u$ has elapsed from arbitrarily selected time $t=t_a$ ($\omega=\omega_a$) and dividing the velocity increment $\omega_b - \omega_a$ by the unit length of time $t_u = t_b - t_a$.

Figure 4:
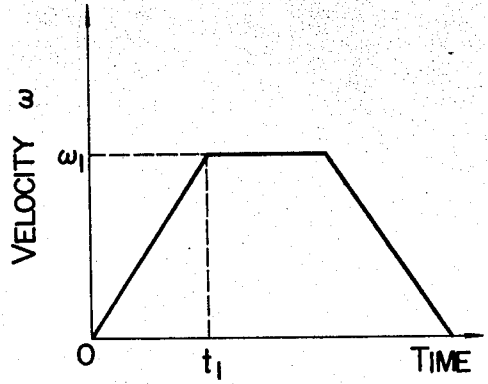
FIG. 4 is a graph illustrating the manner of calculating the acceleration by measuring the length of time required until a unit velocity change is attained.

FIG. 4 illustrates the latter method. In FIG. 4, the change of the velocity until the commanded maximum velocity $\omega_1$ is attained after starting at time $t=0$ ($\omega=0$) is taken as a unit velocity change, and the length of time $t_1$ required for making this unit velocity change is measured so as to calcuate the acceleration $\alpha_1$ according to the following equation (18):

$$\alpha_1 = \omega_1 / t_1 \quad (18)$$

While $\omega_1$ is considered to represent the unit velocity change in the above calculation, this is not necessarily an essential requirement. Thus, as described already with reference to FIG. 3, time $t=t_d$, at which the velocity $\omega=\omega_c$ at arbitrarily selected time $t=t_c$ increases by a unit velocity change $\omega_u$ to attain the velocity $\omega=\omega_d$, is measured, and the unit velocity change $\omega_u = \omega_d - \omega_c$ is divided by the length of time $t_d - t_c$ required therefor to calculate the acceleration $\alpha_1$.

The acceleration $\alpha_1$ calculated in the manner described with reference to FIG. 3 or 4 is utilized for the calculation of the deceleration $\alpha_2$ according to the equation (13) or from the relation $\alpha_2 = \alpha_1$ in which $K_{ad}$ is assumed to be $K_{ad} \approx 1$ as described hereinbefore. The deceleration-start remainder distance $\theta_{d1}$ can also be calculated according to the equation (14). The deceleration $\alpha_2'$ and the deceleration-start remainder distnce $\theta_{d2}$ described hereinbefore can also be entirely similarly calculated according to the equations (15) and (16) respectively, and any detailed description will be unnecessary.

Figure 5:
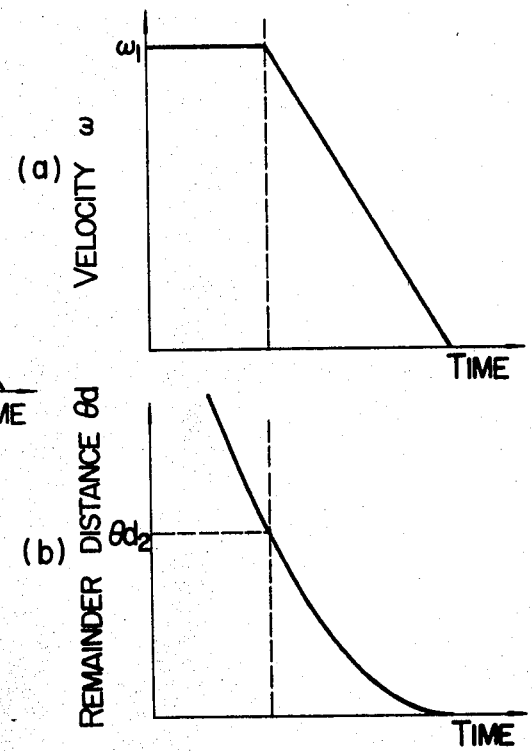
FIG. 5(*a*) is a graph showing the relation between the time and the velocity of the motor until the motor rotating at the steady velocity is decelerated to stop at the desired position, and FIG. 5(*b*) is a graph showing the relation between the time and the remainder angular distance over which the motor is driven in the manner shown in FIG. 5(*a*) to reach the desired position.

The thus calculated deceleration $\alpha_2$ or $\alpha_2'$ is replaced by the velocity $\omega$ corresponding to the deceleration-start remainder distance $\theta_d$ in the practical control. The improved method represented by the solid curves shown in FIG. 2 will now be considered. FIGS. 5(a) and 5(b) show the time-related change of the velocity $\omega$ in the deceleration stage and that of the deceleration-start remainder distance $\theta_d$ respectively.

Suppose that the deceleration stage starts at time $t=0$. Then, the deceleration-start remainder distance $\theta_d$ and velocity $\omega$ are expressed as follows:

$$\theta_d = \theta_{d2} - (\omega_1 \cdot t - \tfrac{1}{2} \alpha_2' \cdot t^2) \tag{19}$$

$$\omega = \omega_1 - \alpha_2' \cdot t \tag{20}$$

Elimination of t from the equations (19) and (20) provides the following equation (21):

$$\omega = \sqrt{2 \cdot \alpha_2' \cdot (\theta_d - \theta_{d2}) + \omega_1^2} \tag{21}$$

Substitution of the equations (15) and (16) into the equation (21) provides the following equation (22):

$$\omega = \sqrt{2 \cdot \alpha_1' \cdot \theta_d} \tag{22}$$

The above value is obtained under assumption of $K_{ad} \approx 1$, and it is apparent that the following equation (23) generally holds:

$$\omega = C' \sqrt{\alpha_1' \cdot \theta_d} \tag{23}$$

where $C'$ is a constant.

This applies entirely similarly to the solid curves shown in FIG. 1, and the velocity $\omega$ can be expressed as $$\omega = \sqrt{2 \cdot \alpha_1 \cdot \theta_d} \tag{24}$$

or $$\omega = C \sqrt{\alpha_1 \cdot \theta_d} \tag{25}$$

Figure 6:
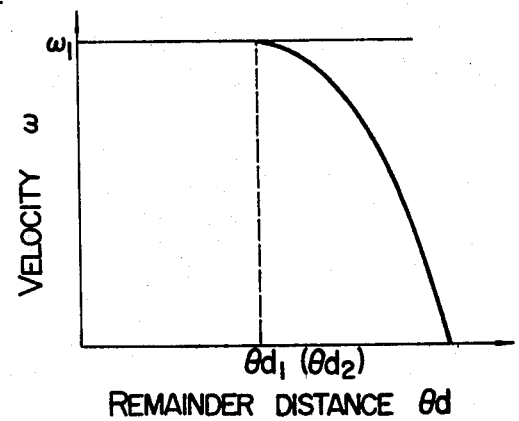
FIG. 6 is a graph showing the relation between the velocity and the remainder angular distance calculated on the basis of the relations shown in FIG. 5.

Suppose that the value of the acceleration $\alpha_1$ (or $\alpha_1'$) the equations (22) to (25) is already known. Then, the relation between the velocity $\omega$ and the deceleration-start remainder distance $\theta_d$ will be as shown in FIG. 6. That is, by measuring the acceleration $\alpha_1$ (or $\alpha_1'$) in the acceleration stage, substituting the measured value of the acceleration $\alpha_1$ (or $\alpha_1'$) into the equations (22) to (25) and calculating the relation between the velocity $\omega$ and the deceleration-start remainder distance $\theta_d$, the instantaneous velocity $\omega_N$ (the command value) of the motor shaft being decelerated from the command maximum velocity $\omega = \omega_1$ to the velocity $\omega =$ can be calculated. In this manner, by measuring the acceleration $\alpha_1$ (or $\alpha_1'$) in the acceleration stage and, on the basis of the measured value of the acceleration $\alpha_1$ (or $\alpha_1'$), calculating the velocity command value $\omega_N$ relative to the deceleration-start remainder distance $\theta_d$ for each stepping operation of the motor, the positioning control dealing sufficiently with the factors including the load variation can be smoothly attained.

Aside from the foregoing discussion, the timing for calculating the deceleration-start remainder distance $\theta_{d1}$ (or $\theta_{d2}$) and the timing for calculating the velocity command value $\omega_N$ in the deceleration stage will now be discussed.

Basically, it is desirable to calculate the deceleration-start remainder distance $\theta_{d1}$ (or $\theta_{d2}$) and velocity command value $\omega_N$ in the deceleration stage each time the positioning command value $\theta_O$ is refreshed and the motor is accelerated under positioning control. For the purpose of the above calculation, it is necessary to calculate the acceleration $\alpha_1$ (or $\alpha_1'$) by dividing the velocity by the unit length of time and to calculate the deceleration-start remainder distance $\theta_{d1}$ (or $\theta_{d2}$) and velocity command value $\omega_N$ in the deceleration stage on the basis of the calculated value of the acceleration $\alpha_1$ (or $\alpha_1'$).

In the method in which the acceleration $\alpha_1$ (or $\alpha_1'$) is calculated on the basis of the unit velocity, a length of time is required until the unit velocity is attained, and another length of time is required to calculate the deceleration-start remainder distance $\theta_{d1}$ (or $\theta_{d2}$) and velocity command value $\omega_N$ in the deceleration stage on the basis of the calculated length of time. Therefore, when the positioning command value $\theta_O$ is too small to secure the former length of time, it is impossible to carry out the method in which the acceleration $\alpha_1$ (or $\alpha_1'$) is calculated to calculate the values of $\theta_{d1}$ (or $\theta_{d2}$) and $\omega_N$ for the purpose of positioning control.

It is therefore another feature of the present invention that the positioning control is carried out by fetching the positioning command value $\theta_O$, comparing it with a predetermined reference value $\theta_c$ (rad) so as to find whether or not the positioning command value $\theta_O$ is large enough to newly calculate the values of $\theta_{d1}$ (or $\theta_{d2}$) and $\omega_N$, and, when the result of comparison proves that $\theta_O < \theta_c$, using pregiven values of $\theta_{d1}$ (or $\theta_{d2}$) and $\omega_N$ or the values of $\theta_{d1}$ (or $\theta_{d2}$) and $\omega_N$ having been calculated in the previous step of positioning control.

Figure 7A:
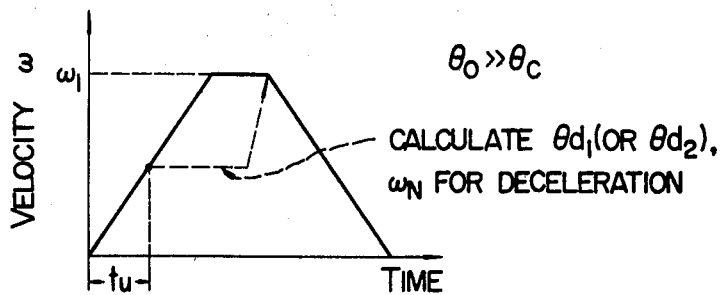
FIGS. 7A to 7C are graphs illustrating the step of calculating the remainder angular distance for which the motor should start to be decelerated to reach the desired position and the step of calculating the deceleration velocity command value.
Figure 7B:
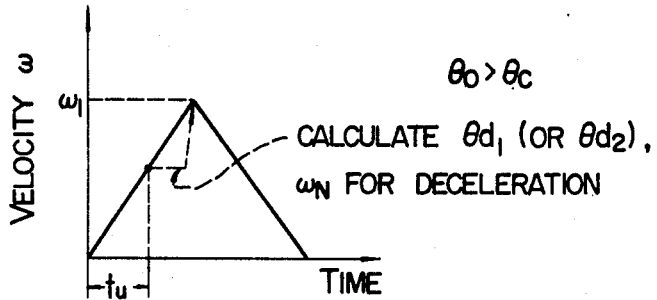
Figure 7C:
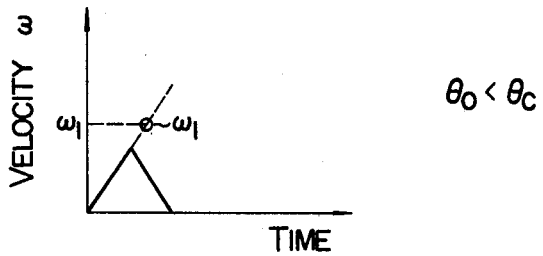

Such a mode of positioning control is shown in FIG. 7. FIGS. 7A, 7B and 7C represent the relation between the velocity $\omega$ and the time when the relation between $\theta_O$ and $\theta_c$ is $\theta_O \gg \theta_c$, $\theta_O > \theta_c$ and $\theta_O < \theta_c$ respectively. In the case of FIGS. 7A and 7B, the acceleration $\alpha_1$ (or $\alpha_1'$) the acceleration stage is calculated to calculate the deceleration-start remainder distance $\theta_{d1}$ (or $\theta_{d2}$) and velocity command value $\omega_N$, while, in the case of FIG. 7C, the values of $\theta_{d1}$ (or $\theta_{d2}$) and $\omega_N$ are not calculated due to the impossibility of calculation of the acceleration $\alpha_1$ (or $\alpha_1'$), and the pregiven or previously calculated values of $\theta_{d1}$ (or $\theta_{d2}$) and $\omega_N$ are used.

An embodiment of the motor position control method according to the present invention will be described together with an embodiment of the motor position control apparatus according to the present invention with reference to FIGS. 8 to 19.

Figure 8:
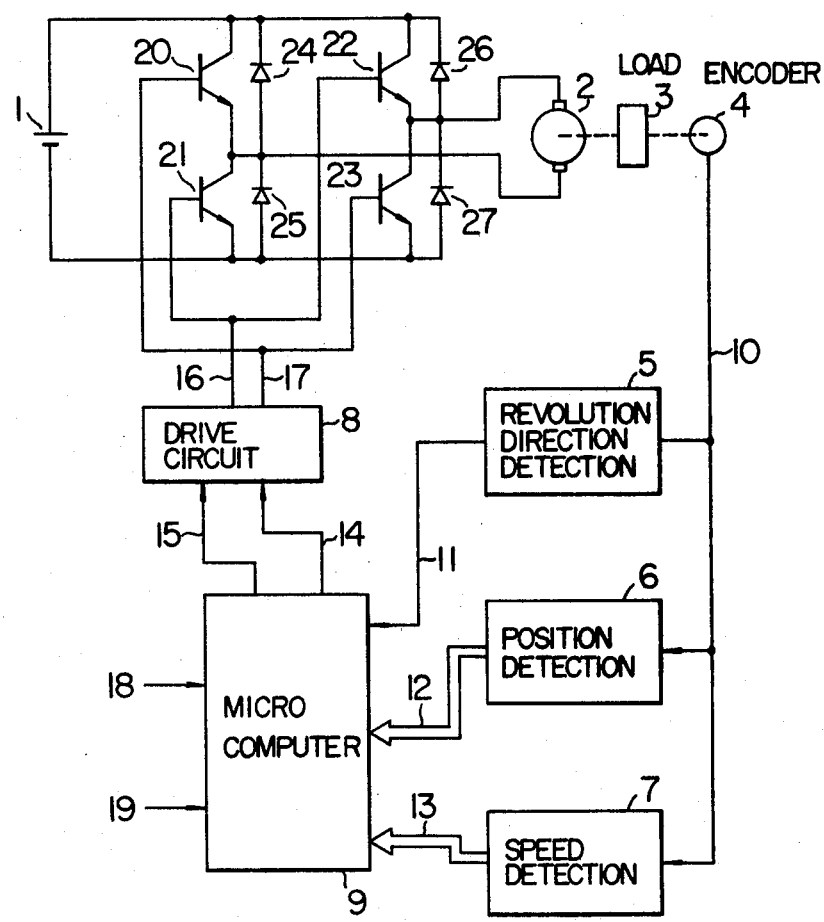
FIG. 8 shows the structure of an embodiment of the motor position control apparatus according to the present invention.

Referring first to FIG. 8 showing the structure of an embodiment of the motor position control apparatus according to the present invention, an H-shaped bridge circuit including transistors 20 to 23 and a bridge circuit including diodes 24 to 27 are connected across a DC power source 1. More precisely, the collectors of the transistors 20, 22 and the cathodes of the diodes 24, 26 are connected to the positive terminal of the power source 1, and the emitters of the transistors 21, 23 and the anodes of the diodes 25, 27 are connected to the negative terminal of the power source 1.

The emitter of the transistor 20, the collector of the transistor 21, the anode of the diode 24 and the cathode of the diode 25 are connected to one of the terminals of a stepping motor 2, while the emitter of the transistor 22, the collector of the transistor 23, the anode of the diode 26 and the cathode of the diode 27 are connected to the other terminal of the motor 2.

The shaft of the motor 2 drives a load 3 and an encoder 4, and the encoder 4 generates its output signal 10 indicative of revolution of the motor 2. This output signal 10 is applied to a revolution direction detection circuit 5, a position detection circuit 6 and a velocity detection circuit 7.

The revolution direction detection circuit 5 generates its output signal 11 indicative of the direction of revolution of the motor 2, and this signal 11 is applied to a microcomputer 9 and also to the position detection circuit 6.

The position detection circuit 6 generates its output signal 12 indicative of the position of the motor 2, and the velocity detection circuit 7 generates its output signal 13 indicative of the velocity of the motor 2. The position signal 12 and the velocity signal 13 are also applied to the microcomputer 9. In addition to the signals above described, a positioning command signal 18 and a maximum velocity command signal 19 are externally applied to the microcomputer 9.

The microcomputer 9 generates a duty factor signal 14 and a forward/backward revolution signal 15 which are applied to a drive circuit 8. A forward revolution signal 16 appearing from the drive circuit 8 is connected to the bases of the transistors 21, 22, and a backward revolution signal 17 appearing from the drive circuit 8 is connected to the bases of the transistors 20, 23.

The operation of the apparatus having such a construction will now be described.

In response to the application of the positioning command signal 18 and maximum velocity command signal 19, the microcomputer 9 executes necessary calculation on the inputs including the revolution direction signal 11 indicative of the direction of revolution of the motor 2, the position signal 12 indicative of the position of the motor 2 and the velocity signal 13 indicative of the velocity of the motor 2. After the calculation, the microcomputer 9 applies to the drive circuit 8 the duty factor signal 14 for controlling the voltage applied across the motor 2 and the forward/backward revolution signal 15 for determining the direction of revolution of the motor 2.

When the motor 2 rotates in the forward direction, the forward revolution signal 16 appears from the drive circuit 8, and the transistors 21 and 22 are turned on to control the voltage according to the duty factor provided by the duty factor signal 14, thereby providing the rotating force for rotating the motor 2 in the forward direction.

In the initial stage of acceleration, the motor position indicated by the position signal 12 does not conform to that commanded by the positioning command signal 18. In such a stage, therefore, the duty factor of the voltage applied across the motor 2 is increased so that the velocity of the motor 2 can be increased at a rapid rate.

As the velocity of the motor 2 increases until the velocity indicated by the velocity signal 13 approaches the maximum velocity commanded by the maximum velocity command signal 19, the backward revolution signal 17 appears now from the drive circuit 8 so that the motor 2 can be stopped at the position commanded by the positioning command signal 18. In response to the application of the signal 17, the transistors 20 and 23 are turned on, and braking force is imparted to the motor 2 so that the motor 2 can be quickly and stably stopped at the position commanded by the positioning command signal 18.

The structure and operation of the various blocks shown in FIG. 8 will now be described in further detail.

Figure 9:
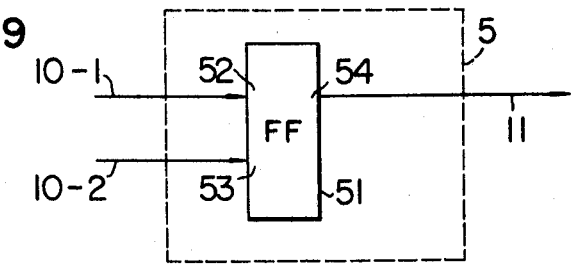
FIG. 9 is a block diagram showing schematically the structure of one form of the revolution direction detection circuit in the embodiment shown in FIG. 8.

FIG. 9 shows the structure of the revolution direction detection circuit 5. Referring to FIG. 9, a revolution signal 10-1 of one phase is applied from the encoder 4 to the clock terminal 52 of a D-type flip-flop 51, and another revolution signal 10-2 of a different phase is applied from the encoder 4 to the D terminal 53 of the flip-flop 51.

The input applied to the clock terminal 52 triggers the flip-flop 51 with its rising edge. Therefore, when the phase of the revolution signal 10-2 applied from the encoder 4 advances relative to that of the revolution signal 10-1, as in a range before time $t_e$ shown in FIG. 10, the revolution signal 10-2 applied to the D terminal 53 of the flip-flop 51 is in its "1" level at the rise time of the revolution signal 10-1 applied to the clock terminal 52, and the revolution direction signal 11 appearing from the output terminal 54 of the flip-flop 51 is in its "1" level as shown in FIG. 10.

Figure 10:
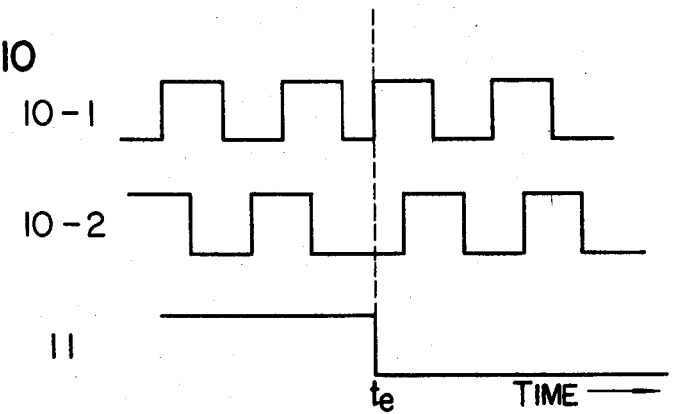
FIG. 10 is a time chart illustrating the operation of the circuit shown in FIG. 9.

On the other hand, when the direction of revolution of the encoder 4 is changed, and the phase of the revolution signal 10-2 delays relative to that of the revolution signal 10-1 as in a range after time $t_e$ shown in FIG. 10, the revolution signal 10-2 applied to the D terminal 53 of the flip-flop 51 is in its "0" level at the rise time of the revolution signal 10-1 applied to the clock terminal 52, and the revolution direction signal 11 appearing from the output terminal 54 of the flip-flop 51 is in its "0" level. In the manner above described, the revolution direction detection circuit 5 can detect the direction of revolution of the motor 2.

The structure of the position detection circuit 6 will be described in detail with reference to FIG. 11.

Figure 11:
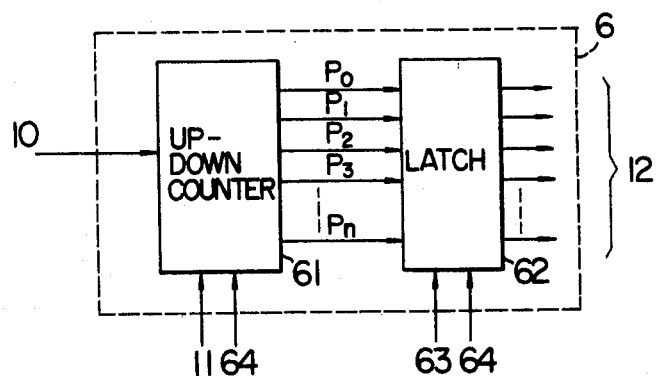
FIG. 11 is a block diagram showing schematically the structure of one form of the position detection circuit in the embodiment shown in FIG. 8.

Referring to FIG. 11, the position detection circuit 6 includes an up/down counter 61 and a latch 62. The revolution signal 10 is applied as a clock input to the up/down counter 61, and the revolution direction signal 11 is applied as an up/down input.

Outputs $P_o$ to $P_n$ from the bit output terminals of the up/down counter 61 are connected to the corresponding bit input terminals of the latch 62, and outputs from the bit output terminals of the latch 62 are applied as the position signal 12.

A strobe signal 63 is applied to the strobe terminal of the latch 62 to latch the contents of the up/down counter 61. A reset signal 64 is applied to the reset input terminals of the up/down counter 61 and latch 62.

Figure 12:
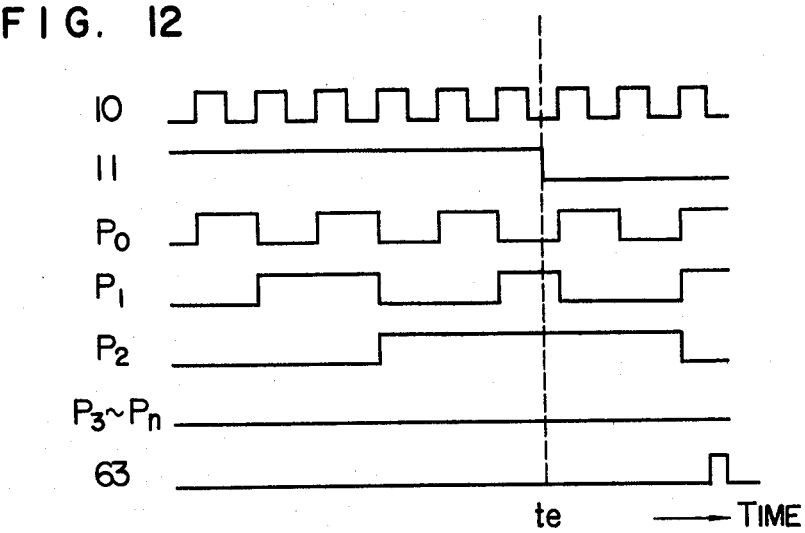
FIG. 12 is a time chart illustrating the operation of the circuit shown in FIG. 11.

FIG. 12 is a time chart illustrating the operation of the position detection circuit 6. The up/down counter 61 counts the pulses of the revolution signal 10 applied as its clock input. The counter 61 operates as a count-up counter and counts up the input pulses during the period of time (before time $t_e$) in which the revolution direction signal 11 remains in its "1" level. Thus, before time $t_e$, the output signal of the counter is represented by $P_o$ to $P_2$ as shown in FIG. 12.

However, when the direction of revolution of the motor 2 is reversed at time $t_e$, the revolution direction signal 11 turns into its "0" level after time $t_e$ as shown in FIG. 12, and the up/down counter 61 operates now as a down counter and starts to count down.

The strobe signal 63 is applied to the latch 62 at intervals of a predetermined period of time to latch the contents of the up/down counter 61 so that the position signal 12 can indicate the renewed value of the position.

In response to the application of a new positioning command signal 18, the reset signal 64 is applied to the reset terminals of the up/down counter 61 and latch 62 to reset the same.

Figure 13:
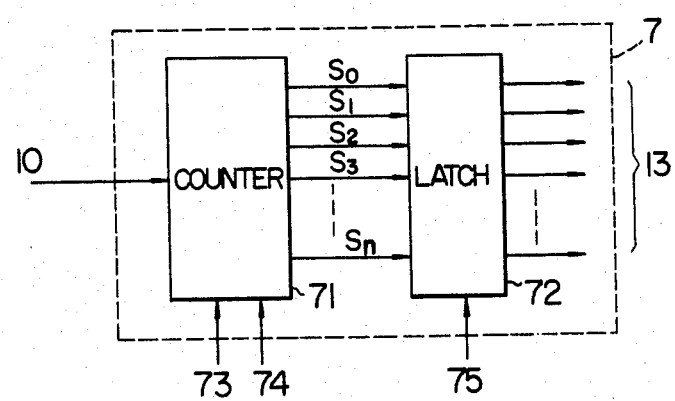
FIG. 13 is a block diagram showing schematically the structure of one form of the velocity detection circuit in the embodiment shown in FIG. 8.

The velocity detection circuit 7 includes a counter 71 and a latch 72 as shown in FIG. 13.

The revolution signal 10 from the encoder 4 is applied as a clock input to the counter 71, and a counter enable signal 73 having a predetermined pulse width and a counter reset signal 74 are applied to the enable terminal and reset terminal respectively of the counter 71.

Outputs $S_o$ to $S_n$ from the bit output terminals of the counter 71 are connected to the corresponding bit input terminals of the latch 72, and outputs from the bit output terminals of the latch 72 are applied to the microcomputer 9 as the velocity signal 13. A strobe signal 75 is applied to the strobe terminal of the latch 72.

Figure 14:
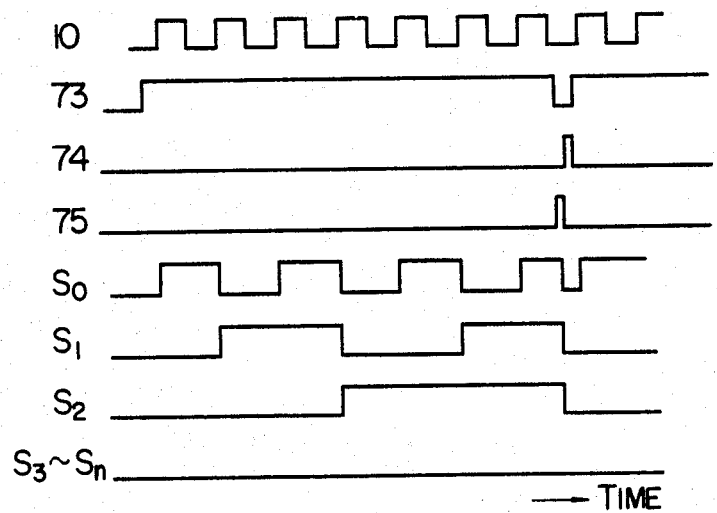
FIG. 14 is a time chart illustrating the operation of the circuit shown in FIG. 13.

FIG. 14 is a time chart illustrating the operation of the velocity detection circuit 7. The counter 71 continues to count the pulses of the revolution signal 10 during the lasting period of the counter enable signal 73 to generate its outputs $S_o$ to $S_n$ as shown in FIG. 14.

The latch strobe signal 75 is then applied to the strobe terminal of the latch 72 to latch the outputs $S_o$ to $S_n$ applied from the counter 71. As soon as the counter outputs are latched, the counter reset signal 74 is applied to the reset terminal of the counter 71 to reset the same, and the counter 71 is now ready to receive the next input 10.

Therefore, the counter 71 continues to count the pulses of the revolution signal 10 during the predetermined lasting period of the counter enable signal 73, so that the velocity signal 13 has the value proportional to the velocity of the motor 2.

Figure 15:
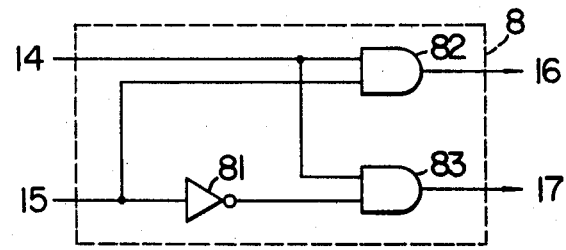
FIG. 15 is a block diagram showing schematically the structure of one form of the drive circuit in the embodiment shown in FIG. 8.

The drive circuit 8 includes an inverter gate 81 and a pair of AND gates 82 and 83 as shown in FIG. 15. The duty factor signal 14 is connected to one of the input terminals of each of the AND gates 82 and 83. The forward/backward revolution signal 15 is connected to the other input terminal of the AND gate 82 and to the other input terminal of the AND gate 83 through the inverter gate 81.

Figure 16:
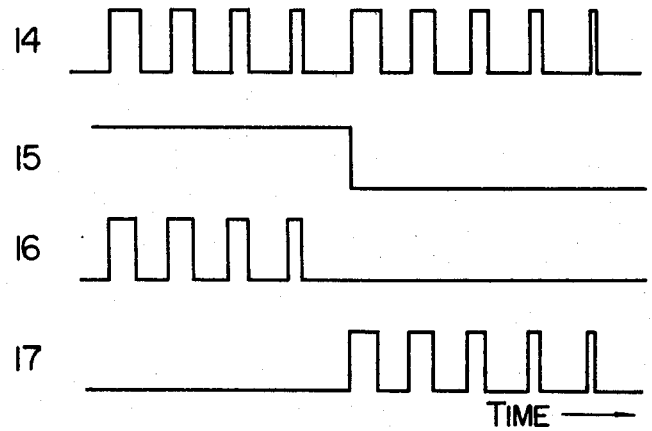
FIG. 16 is a time chart illustrating the operation of the circuit shown in FIG. 15.

FIG. 16 is a time chart illustrating the operation of the drive circuit 8 having such a structure. In response to the application of the duty factor signal 14 and forward/backward revolution signal 15 to the drive circuit 8, the duty factor signal 14 appears at the output terminal of the AND gate 82 to provide the forward revolution signal 16 during only the period of time in which the forward/backward revolution signal 15 is in its "1" level.

On the other hand, the duty factor signal 14 appears at the output terminal of the AND gate 83 to provide the backward revolution signal 17 during only the period of time in which the forward/backward revolution signal 15 is in its "0" level.

The microcomputer 9 includes a central processor unit (CPU), a random access memory (RAM), a read-only memory (ROM) and an input/output interface and operates according to a program stored in the ROM.

Figure 17:
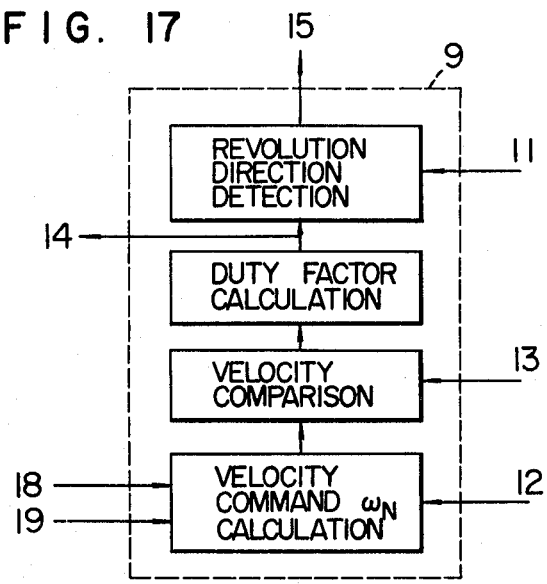
FIG. 17 is a block diagram illustrating schematically the functions of the microcomputer in the embodiment shown in FIG. 8.

FIG. 17 is a block representation of the operation of the microcomputer 9.

When the positioning command signal 18 and maximum velocity command signal 19 are externally applied to the CPU through the input/output interface, the positioning command signal 18 is compared with the position signal 12 indicative of the present position of the motor shaft, and, on the basis of the maximum velocity command signal 19, the corresponding velocity command value $\omega_N$ is calculated.

Then, in response to the application of the velocity signal 13 indicative of the present velocity of the motor, the duty factor corresponding to the difference between the present velocity and the command velocity $\omega_N$ is calculated, and the duty factor signal 14 indicative of the calculated duty factor is applied from the microcomputer 9 to the drive circuit 8.

In response to the application of the revolution direction signal 11, whether the direction of revolution of the motor 2 is forward or backward is judged on the basis of the signals including the positioning command signal 18 and position signal 12, and the forward/backward revolution signal 15 is applied from the microcomputer 9 to the drive circuit 8.

The details of the motor position control method controlling the position of the motor 2 by the apparatus having the construction above described will now be described with reference to a flow chart of FIG. 18.

In the initial step of the program, the positioning command value $\theta_o$ is compared with the pregiven reference value $\theta_c$. That is, when the program is started, the externall-applied commanded maximum velocity $\omega_1$ and positioning command value $\theta_o$ are read in step 100 from the maximum velocity command signal 19 and positioning command signal 18 shown in FIG. 8, respectively.

In step 102, judgement is made as to whether or not the positioning command value $\theta_o$ is larger than the pregiven reference value $\theta_c$. When the result of judgement in step 102 proves that $\theta_o > \theta_c$, the revolustion direction $R_w$, position $\theta$ and velocity $\omega$ are read in step 104 from the revolution direction signal 11, position signal 12 and velocity signal 13 shown in FIG. 8, respectively. In step 106, the velocity command value $\omega_N$, duty factor $D_t$ and forward/backward revolution $R_o$ are calculated on the basis of the values of $R_w$, $\theta$ and $\omega$ respectively. Then, in step 108, the microcomputer 9 applies the duty factor signal 14 and forward/backward revolution signal 15 shown in FIG. 8 to the drive circuit 8.

In step 110, judgement is made as to whether or not the position $\theta$ indicated by the position signal 12 has attained the pregiven reference value $\theta_c$ provided for the measurement of acceleration and deceleration of the motor 2. When the result of judgement in step 110 proves that the distance $\theta$ has not yet reached the value $\theta_c$, the program proceeds to step 114. On the other hand, when the result of judgement in step 110 proves that the distance $\theta$ has reached the value $\theta_c$, the velocity value $\omega$ at that time (the velocity $\omega$ of the motor 2 detected by the encoder 4) and the value of $t_c$ indicative of the period of time required until attainment of the velocity $\omega_c$ are stored in the memory in step 112.

In step 114, the velocity $\omega$ is compared with the commanded maximum velocity $\omega_1$. When the result of comparison in step 114 proves that $\omega < \omega_1$, the program returns to the step 104 so as to repeat the steps 104 to 114 again.

On the other hand, when the result of comparison in step 114 proves that $\omega = \omega_1$, the values of $\omega_c$ and $t_c$ stored in step 112 in the memory are read out from the memory, and the deceleration-start remainder distance $\theta_{d1}$ (or $\theta_{d2}$) and deceleration pattern are calculated in step 116.

The above steps complete the routine for the acceleration of the motor 2, and the routine for the steady operation of the motor 2 is then executed to control the motor 2 in the stage of steady revolution.

In step 118, the velocity $\omega$ is read from the velocity signal 13. In step 120, judgement is made as to whether or not the velocity $\omega$ is maintained at the commanded maximum velocity $\omega_1$. When the result of judgement in step 120 proves that $\omega = \omega_1$, the program proceeds to step 126. On the other hand, when the result of judgement in step 120 proves that $\omega \neq \omega_1$, the duty factor $D_t$ and forward/backward revolution $R_o$ are calculated in step 122, and the signals indicative of the calculated values of $D_t$ and $R_o$ are generated in step 124.

In step 126, the position $\theta$ is read from the position signal 12, and, in step 128, the position $\theta$ is compared with the deceleration-start remainder distance $\theta_{d1}$ (or $\theta_{d2}$). When the result of comparison in step 128 proves that the distance $\theta_{d1}$ (or $\theta_{d2}$) has not been reached, the motor 2 continues to run at the velocity $\omega_1$ of steady revolution. On the other hand, when the result of comparison in step 128 proves that the distance $\theta_{d1}$ (or $\theta_{d2}$) has been reached, the motor 2 is now decelerated.

In the routine for the motor deceleration, the previously calculated deceleration pattern is read out from the memory in step 130. In step 132, the position $\theta$ is read from the position signal 12, and, in step 134, the duty factor $D_t$ and forward/backward revolution $R_o$ are calculated on the basis of the deceleration pattern and position $\theta$. In step 136, the signals indicative of the calculated values of $D_t$ and $R_o$ are generated.

In step 138, judgement is made as to whether or not the position $\theta$ has reached the position $\theta_t$ sufficient to stop the motor 2 at the desired position. When the result of judgment in step 138 proves that the position $\theta_t$ has been reached, the stop routine is started to stop the motor 2 according to the stop pattern. The value of $\theta_t$ above described is generally very small or $\pm 1°$ to $2°$ in terms of the degree unit.

When the result of judgement in step 102 proves that the positioning command value $\theta_o$ is smaller than the pregiven reference value $\theta_c$ or $\theta_o < \theta_c$, steps 140 to 148 are executed. In step 140, the previous values of $\omega_c$ and $t_c$ stored in the memory (the pregiven values of $\omega_c$ and $t_c$ stored in the memory in the case of initial positioning control) are read out to be used for the calculation of the deceleration-start remainder distance $\theta_{d1}$ (or $\theta_{d2}$) and deceleration pattern.

Then, in step 142, the present velocity $\omega$, present position $\theta$ and present direction of revolution $R_w$ are read from the velocity signal 13, position signal 12 and revolution direction signal 11 respectively, and, in step 144, the duty factor $D_t$ and forward/backward revolution $R_o$ are calculated. Then, in step 146, the signals indicative of the calculated values of $D_t$ and $R_o$ are generated to start acceleration of the motor 2.

In step 148, the position $\theta$ is read from the position signal 12 to be compared with the deceleration-start remainder distance $\theta_{d1}$ (or $\theta_{d2}$). When the result of comparison in step 148 proves that the distance $\theta_{d1}$ (or $\theta_{d2}$) has not been reached, the acceleration steps 142 to 148 are repeated. On the other hand, when the result of comparison proves that the distance $\theta_{d1}$ (or $\theta_{d2}$) has been reached, the program proceeds to the step 130 of the deceleration routine.

It will be seen from the above description that the method of the present invention includes the step in which judgement is made as to whether or not the positioning command value $\theta_o$ exceeds the pregiven reference value $\theta_c$, so that the optimum deceleration pattern for decelerating the motor 2 can be calculated on the basis of the data read or calculated during the stage of acceleration. Therefore, the motor position control apparatus according to the present invention can decelerate the motor smoothly without vibration according to the optimum deceleration pattern without being affected by variations of the inertia of the load and the current supplied to the motor.

In the method described with reference to FIG. 18, the velocity $\omega_c$ and time $t_c$ at which the position $\theta$ has reached the pregiven reference position $\theta_c$ are stored in the memory to be used for the calculation of the deceleration-start remainder distance $\theta_{d1}$ (or $\theta_{d2}$) and deceleration pattern. However, the velocity $\omega_u$ and position $\theta_u$ measured after lapse of a predetermined period of time $t_u$ from arbitrarily selected time may be stored in the memory, and, on the basis of such values, the deceleration-start remainder distance $\theta_{d1}$ (or $\theta_{d2}$) and deceleration pattern may be calculated to exhibit the effect similar to that above described.

Another embodiment of the method according to the present invention will be described with reference to a flow chart of FIG. 19. As described hereinbefore, the equation (13) provides the relation $\alpha_1/\alpha_2 = K_{ad}$. In the method to be described now, the sequence of starting-acceleration-steady operation-deceleration of the motor 2 is initially run prior to the actual operation to find the acceleration $\alpha_1$ (or $\alpha_1'$) and deceleration $\alpha_2$ (or $\alpha_2'$), to calculate the ratio $K_{ad}$ therebetween, and to store the calculated value of $K_{ad}$ in the memory. According to this method, the stored value of $K_{ad}$ is read out from the memory in the actual operation of the motor 2, so that the deceleration-start remainder distance $\theta_{d1}$ (or $\theta_{d2}$) and deceleration pattern can be calculated more accurately than when the value of $K_{ad}$ is set at $K_{ad} \approx 1$.

Figure 19:
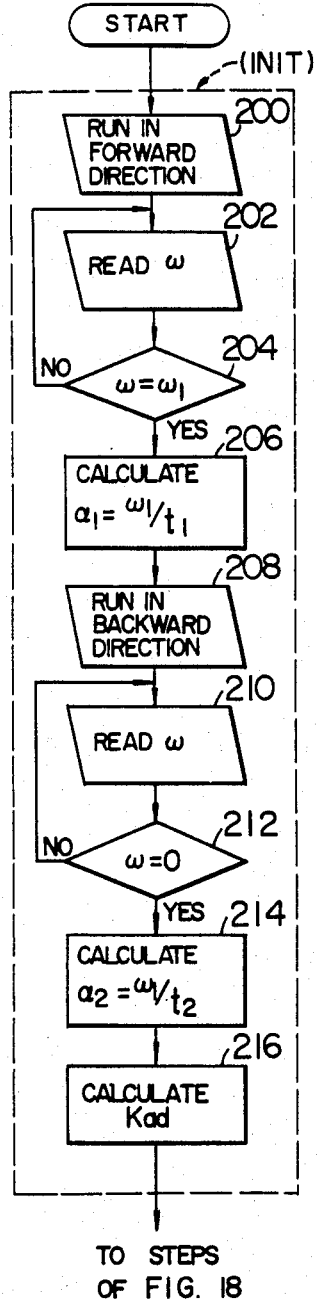

In the flow chart of FIG. 19, the block surrounded by the dotted lines and labelled "INIT" indicates a trial operation including a plurality of steps for calculating the value of $K_{ad}$.

In step 200, the motor 2 is rotated in the forward direction of revolution, and, in step 202, the velocity $\omega$ is read from the velocity signal 13. In step 204, judgement is made as to whether or not the velocity $\omega$ has attained the commanded maximum velocity $\omega_1$. When the result of judgement in step 204 proves that the velocity $\omega$ has reached the value $\omega_1$, the acceleration $\alpha_1 = \omega_1/t_1$ is calculated in step 206 on the basis of the value of $\omega_1$ and the length of time $t_1$ required for the attainment of the commanded maximum velocity $\omega_1$. Then, in step 208, the motor 2 is rotated in the backward direction of revolution, and, in step 210, the velocity $\omega$ is read from the velocity signal 13. In step 212, judgment is made as to whether or not the velocity $\omega$ is reduced to zero. When the result of judgment in step 212 proves that $\omega = 0$, the deceleration $\alpha_2 = \omega_1/t_2$ is calculated in step 214 on the basis of the value of $\omega_1$ and the length of time $t_2$ required for the velocity $\omega_1$ to be reduced to zero. On the basis of the acceleration $\alpha_1$ and deceleration $\alpha_2$ thus calculated, the ratio $K_{ad}$ is calculated and stored in the memory in step 216.

The value of $K_{ad}$ thus obtained by the steps of the trial operation of the motor 2 is used for the calculation of the deceleration-start remainder distance $\theta_{d1}$ (or $\theta_{d2}$)

and deceleration pattern in the step 116 or 140 in the flow chart of FIG. 18.

Still another embodiment of the method according to the present invention will now be described. In the aforementioned embodiments, for example, in the embodiment shown in FIG. 18, the deceleration pattern is calculated in step 116 or 140 each time the position of the motor 2 is to be controlled. In contrast, in the embodiment which will be described now, a plurality of deceleration patterns are previously stored in the ROM of the microcomputer 9, and a most suitable one of them is selected each time the position of the motor 2 is to be controlled. Such an embodiment will be described with reference to a flow chart of FIG. 20.

The program starts from the stage of acceleration. In step 300, the positioning command value $\theta_o$ and maximum velocity command value $\omega_1$ are read from the externally-applied positioning command signal 18 and maximum velocity command signal 19 respectively shown in FIG. 8.

Then, in step 302, the revolution direction $R_w$, position $\theta$ and velocity $\omega$ of the motor 2 are read from the revolution direction signal 11, position signal 12 and velocity signal 13 respectively applied to the microcomputer 9 shown in FIG. 8. On the basis of these information, the velocity command value $\omega_N$, the duty factor $D_t$ determining the voltage applied across the motor 2, and the forward/backward revolution $R_o$ are calculated in step 304. In step 306, the duty factor signal 14 indicative of the calculated value of $D_t$ and the forward/backward revolution signal 15 indicative of the calculated value of $R_o$ are applied from the microcomputer 9 to the drive circuit 8 in FIG. 8.

In step 308, judgment is made as to whether or not the velocity $\omega$ has attained the commanded maximum velocity $\omega_1$. When the result of judgment in step 308 proves that the velocity $\omega$ has not reached the value $\omega_1$, the program returns to the step 302 to repeat the calculation of $D_t$ and $R_o$ and generation of the signals indicative of $D_t$ and $R_o$ again.

On the other hand, when the result of judgment in step 308 proves that the velocity $\omega$ has reached the value $\omega_1$, the length of time $t_1$ required for the velocity $\omega$ to attain the commanded maximum velocity $\omega_1$ is stored in the memory in step 310. Then, in step 312, the deceleration-start remainder distance $\theta_{d1}$ (or $\theta_{d2}$) is calculated and stored in the memory.

The stage of acceleration is followed by the stage of steady operation. In step 314, the velocity $\omega$ is read from the velocity signal 13, and, in step 316, the velocity $\omega$ is compared with the commanded maximum velocity $\omega_1$. When the result of comparison in step 316 proves that the velocity $\omega$ has reached the value $\omega_1$, the program proceeds to step 318. On the other hand, when the result of comparison in step 316 proves that $\omega \neq \omega_1$, the duty factor $D_t$ and forward/backward revolution $R_o$ are calculated again in step 320, and, in step 322, the signals 14 and 15 indicative of the new values of $D_t$ and $R_o$ respectively are applied from the microcomputer 9 to the drive circuit 8 for the purpose of velocity control. Then, in step 318, the position $\theta$ is read from the position signal 12, and judgment is made in step 324 as to whether the previously-calculated deceleration-start remainder distance $\theta_{d1}$ (or $\theta_{d2}$) has been reached or not. When the result of judgment in step 324 proves that the distance $\theta_{d1}$ (or $\theta_{d2}$) has not been reached, the program returns to the step 314 so as to continue the steady operation. On the other hand, when the result of judgment in step 324 proves that the distance $\theta_{d1}$ (or $\theta_{d2}$) has been reached, a most suitable one of the plural deceleration patterns stored previously in the ROM is selected in step 326 on the basis of the value of $t_1$ stored in the memory in the stage of acceleration and indicative of the length of time required for the velocity $\omega$ to attain the commanded maximum velocity $\omega_1$, so as to decelerate the motor 2 according to the selected deceleration pattern. When now the motor 2 starts to be decelerated, the position $\theta$ is read from the position signal 12 in step 328, and, in step 330, the duty factor $D_t$ and forward/backward revolution $R_o$ are calculated on the basis of the value of $\theta$ and the selected deceleration pattern. In step 332, the signals 14 and 15 indicative of the calculated values of $D_t$ and $R_o$ respectively are applied from the microcomputer 9 to the drive circuit 8.

In step 334, judgment is made as to whether or not the position $\theta$ has attained the value $\theta_t$ sufficient to stop the motor 2 at the desired position. When the result of judgment in step 334 proves that the distance $\theta_t$ has not yet been reached, the program returns to the step 328 so as to continue to decelerate the motor 2. On the other hand, when the result of judgment in step 334 proves that the distance $\theta_t$ has been reached, the motor 2 is stopped according to the stop pattern. This stop routine is executed when the motor 2 has rotated to the position at which the remainder distance is small enough to stop the motor 2 without the possibility of hunting.

Figure 21:
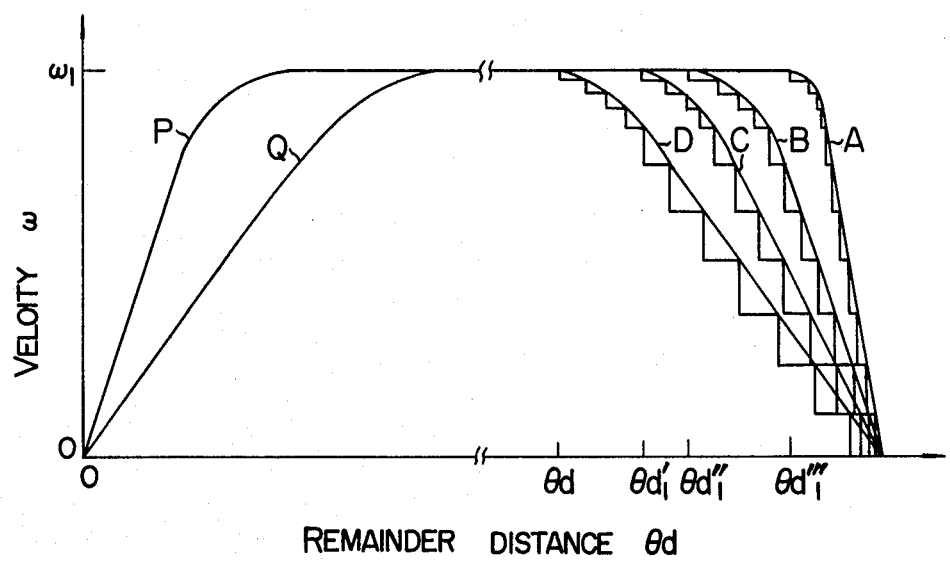
FIG. 21 is a graph illustrating how a most suitable deceleration pattern is selected.

FIG. 21 illustrates how such a deceleration pattern is selected from among a plurality of them, by way of example.

According to the present invention, the velocity $\omega$ relative to the position $\theta$ of the motor in the starting stage of acceleration is measured for calculating, for example, the deceleration-start remainder distance $\theta_{d1}$, $\theta_{d1}'$, $\theta_{d1}''$ or $\theta_{d1}'''$, and a deceleration pattern most analogous to the acceleration pattern is selected from among a plurality of previously recorded or stored deceleration patterns A to D shown in FIG. 21.

When the acceleration pattern in the starting stage of acceleration of the motor rises as shown by, for example, the curve P in FIG. 21, the gradient of the rising curve is detected for calculating the deceleration-start remainder distance $\theta_{d1}''$, and the deceleration pattern B having a gradient of its curve most analogous to the curve of the acceleration pattern P is selected in the motor position control. When, on the other hand, the acceleration pattern rises as shown by the curve Q in FIG. 21, the deceleration-start remainder distance $\theta_{d1}$ is calculated, and the deceleration pattern D having a gradient of its curve most analogous to the curve of the acceleration pattern Q is selected.

It will be understood from the above description of the third embodiment of the method according to the present invention that the deceleration-start remainder distance for stopping the motor at the desired position is calculated on the basis of data measured in the acceleration stage, and a deceleration pattern most suitable for decelerating and stopping the motor is selected from among a plurality of deceleration patterns stored previously in the ROM of the microcomputer. Therefore, the motor can be decelerated to stop according to the most suitable deceleration pattern regardless of variations of the motor characteristic and load condition, so that the position of the motor can be controlled smoothly without the possibility of hunting.

Figure 20:
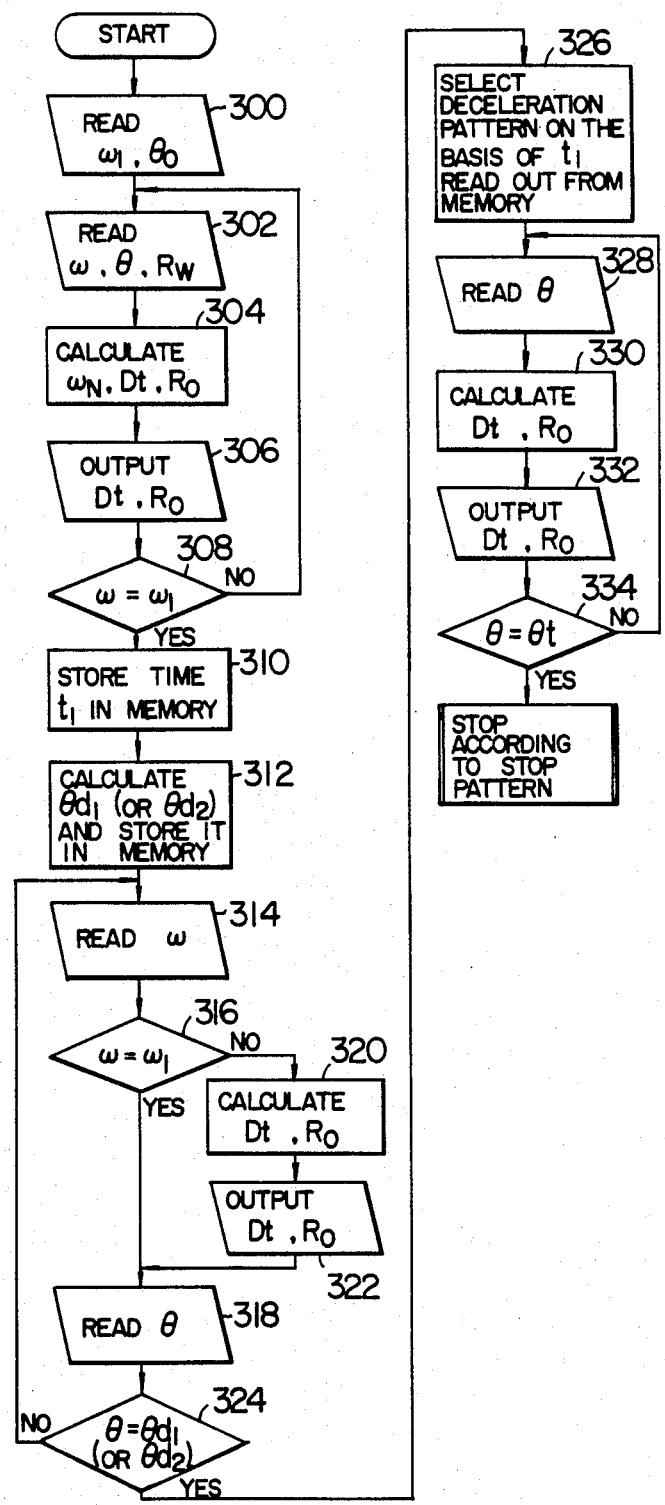

In the embodiment shown in FIG. 20, the length of time $t_1$ required for the velocity $\omega$ of the motor to attain the commanded maximum velocity $\omega_1$ is measured to calculate the deceleration-start remainder distance and to select the most suitable deceleration pattern. However, the length of time required for the velocity $\omega$ of the motor to attain a velocity lower than the commanded maximum velocity $\omega_1$ may be measured to calculate the deceleration-start remainder distance and to select the most suitable deceleration pattern, for achieving the effect similar to that above described.

Further, it is apparent that, instead of measuring the length of time $t_1$ required for the velocity $\omega$ of the motor to attain the commanded maximum velocity $\omega_1$, the rate of change of the velocity $\omega$ within a predetermined period of time may be measured to calculate the deceleration-start remainder distance and to select the most suitable deceleration pattern, for achieving the effect similar to that above described.

We claim:

1. A method for controlling an angular position of a motor equipped on its rotary shaft with an encoder for encoding the angular position of the motor under rotation so that the angular position of the motor can be controlled in response to a given positioning command value, wherein said method comprises the steps of:
   reading a commanded maximum velocity;
   detecting acceleration of the motor being accelerated in an initial acceleration stage of a motor position control operation;
   calculating a motor deceleration-start remainder angular distance and a velocity command value for decelerating the motor in a deceleration stage on the basis of said commanded maximum velocity and said detected acceleration; and
   decelerating the motor on the basis of said calculated motor deceleration-start remainder angular distance and said calculated deceleration velocity command value to stop the motor at an angular position commanded by said given positioning command value.

2. A method for controlling an angular position of a motor equipped on its rotary shaft with an encoder for encoding the angular position of the motor under rotation so that the angular position of the motor can be controlled in response to a given positioning command value, wherein said method comprises the steps of:
   comparing said given positioning command value with a predetermined reference value;
   detecting acceleration of the motor being accelerated in an initial acceleration stage of a motor position control operation when the result of comparison in the comparing step proves that said given positioning command value is not smaller than said predetermined reference value, and calculating a motor deceleration-start remainder angular distance and a velocity command value for decelerating the motor in a deceleration stage on the basis of said detected acceleration and an externally commanded maximum velocity, thereby generating signals indicative of said calculated motor deceleration-start remainder angular distance and said calculated deceleration velocity command value;
   generating signals indicative of a pregiven motor deceleration-start remainder angular distance and a pregiven deceleration velocity command value or generating signals indicative of the motor deceleration-start remainder angular distance and the deceleration velocity command value both used in the previous motor control operation, when the result of comparison in the comparing step proves that said given positioning command value is smaller than said predetermined reference value; and
   decelerating the motor on the basis of said motor deceleration-start remainder angular distance and said deceleration velocity command value provided by said signals to stop the motor at an angular position commanded by said given positioning command value.

3. A method for controlling an angular position of a motor equipped on its rotary shaft with an encoder for encoding the angular position of the motor under rotation so that the angular position of the motor can be controlled in response to a given positioning command value, wherein said method comprises the steps of:
   reading a commanded maximum velocity;
   detecting acceleration of the motor being accelerated in an initial acceleration stage of a motor position control operation;
   calculating a motor deceleration-start remainder angular distance on the basis of said commanded maximum velocity and said detected acceleration, selecting a most suitable deceleration pattern from among a plurality of previously stored deceleration patterns, and calculating a deceleration velocity command value for executing the control according to said selected deceleration pattern; and
   decelerating the motor on the basis of said calculated motor deceleration-start remainder angular distance and said calculated deceleration velocity command value to stop the motor at an angular position commanded by said given positioning command value.

4. A method as claimed in claim 1, 2 or 3, wherein said acceleration is calculated by measuring the rate of change of the velocity of revolution of said rotary shaft per unit time.

5. A method as claimed in claim 1, 2, or 3, wherein said acceleration is calculated by measuring the length of time required for said rotary shaft to make a unit change of the velocity of revolution.

6. A method as claimed in claim 1 or 2, wherein said velocity command value for decelerating the motor in the deceleration stage is calculated on the basis of the principle that its square value is proportional to the product of said acceleration and said motor deceleration-start remainder angular distance.

7. A method as claimed in claim 1, 2 or 3, wherein said method further comprises the step of calculating the ratio between the acceleration and the deceleration of the motor by driving the motor through the stages of acceleration, steady operation and deceleration prior to the motor position control operation started in response to said given positioning command value, said ratio being used for the calculation of said motor deceleration-start remainder angular distance and said deceleration velocity command value during the motor position control operation started in response to said given positioning command value.

8. An apparatus for controlling an angular position of a rotary shaft of a motor, comprising an encoder supported on the rotary shaft and for encoding the angular position of the rotary shaft, and a control circuit for applying a positive or negative variable voltage across said motor in response to a given positioning command value, wherein said control circuit comprises:
   means for receiving said given positioning command value;

means for detecting the revolution velocity and angular position of said rotary shaft on the basis of an output of said encoder;

signal processing means for calculating acceleration of the motor in an initial acceleration stage of a motor position control operation, a motor deceleration-start remainder angular distance and a velocity command value for decelerating the motor in a deceleration stage on the basis of said given positioning command value, said detected velocity and said detected angular position; and means for driving said motor by applying said positive or negative variable voltage across said motor on the basis of the results of calculation.

9. An apparatus for controlling an angular position of a rotary shaft of a motor, comprising an encoder supported on the rotary shaft and for encoding the angular position of the rotary shaft, and a control circuit for applying a positive or negative variable voltage across said motor in response to a given positioning command value, wherein said control circuit comprises:

means for receiving said given positioning command value;

means for detecting the revolution velocity and angular position of said rotary shaft on the basis of an output of said encoder;

means for receiving a maximum velocity command value;

signal processing means for processing signals indicative of said given positioning command value, said maximum velocity command value, said detected velocity and said detected angular position and generating the results of signal processing;

means for driving said motor by applying said positive or negative variable voltage across said motor on the basis of the results of signal processing by said signal processing means; and said signal processing means calculating accleration of the motor being acclerated in an initial acceleration stage of a motor position control operation on the basis of said signals indicative of the velocity and angular position of the rotary shaft when the result of comparison between said given positioning command value and a predetermined reference value proves that the former is not smaller than the latter, and calculating a motor deceleration-start remainder angular distance and a deceleration velocity command value on the basis of said calculated accleration and said given maximum velocity for generating them as said results of signal processing.

10. An apparatus as claimed in claim 8 or 9, wherein said signal processing means is a microcomputer.

11. A method for controlling an angular position of a motor equipped on its rotary shaft with an encoder for encoding the angular position of the motor under rotation so that the angular position of the motor can be controlled in response to a given positioning command value, wherein said method comprises the steps of:

reading a commanded maximum velocity;

detecting acceleration stage of a motor being accelerated in an initial acceleration stage of a motor position control operation, said acceleration being calculated by measuring the rate of change of the velocity of revolution of said rotary shaft per unit time;

calculating a motor deceleration-shaft remainder angular distance and a velocity command value for decelerating the motor in a deceleration stage on the basis of said command maximum velocity and said detected acceleration; and decelerating the motor on the basis of said calculated motor deceleration-start remainder angular distance and said calculated deceleration velocity command value to stop the motor at an angular position commanded by said given positioning command value.

* * * * *